April 29, 1941. J. B. FELDMAN 2,240,156
APPARATUS FOR DETERMINING THE MINIMUM LIGHT VISIBLE
Filed July 17, 1937 4 Sheets-Sheet 1

Inventor:
Jacob B. Feldman,
By Z. T. Wolbensmith
Attorney.

April 29, 1941.  J. B. FELDMAN  2,240,156
APPARATUS FOR DETERMINING THE MINIMUM LIGHT VISIBLE
Filed July 17, 1937  4 Sheets-Sheet 2
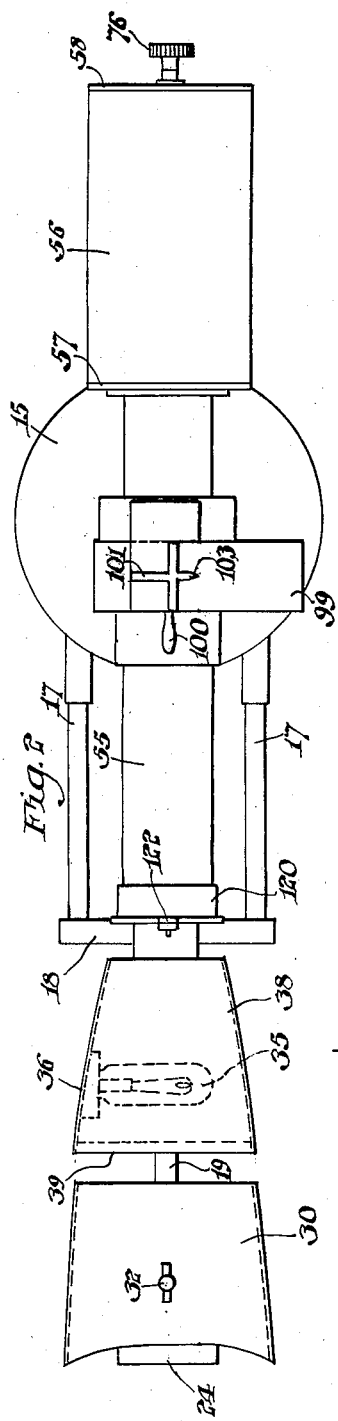
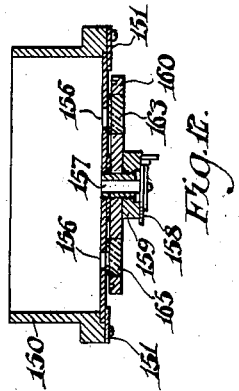
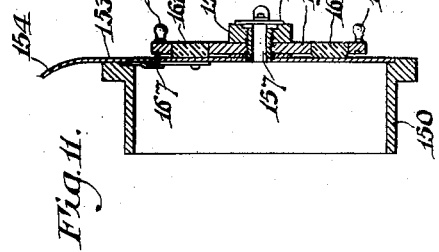
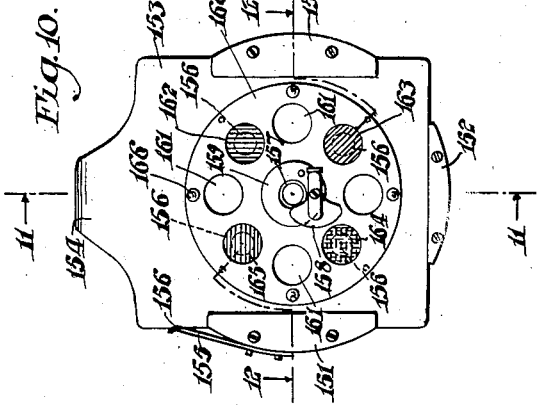
Inventor:
Jacob B. Feldman,
By Z. T. Wolvensmith
Attorney.

April 29, 1941.  J. B. FELDMAN  2,240,156
APPARATUS FOR DETERMINING THE MINIMUM LIGHT VISIBLE
Filed July 17, 1937  4 Sheets-Sheet 3
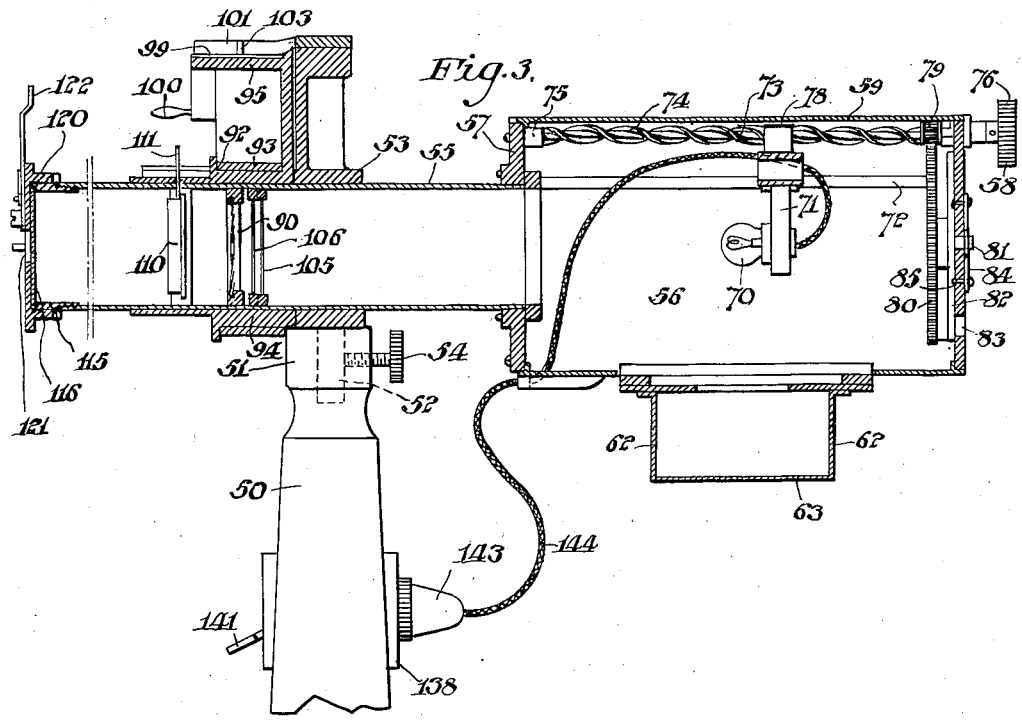
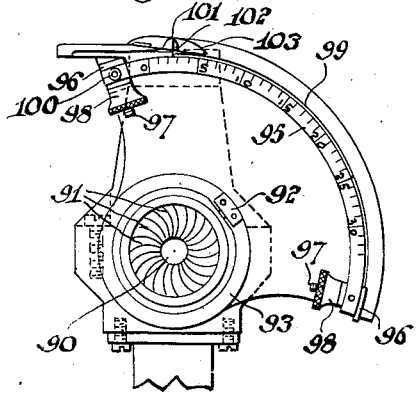
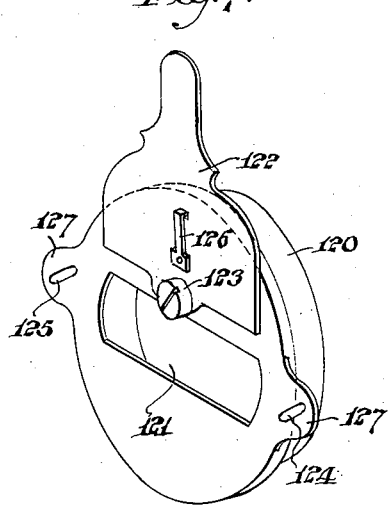
Inventor:
Jacob B. Feldman,
By B. T. Wolsensmith 2nd
Attorney.

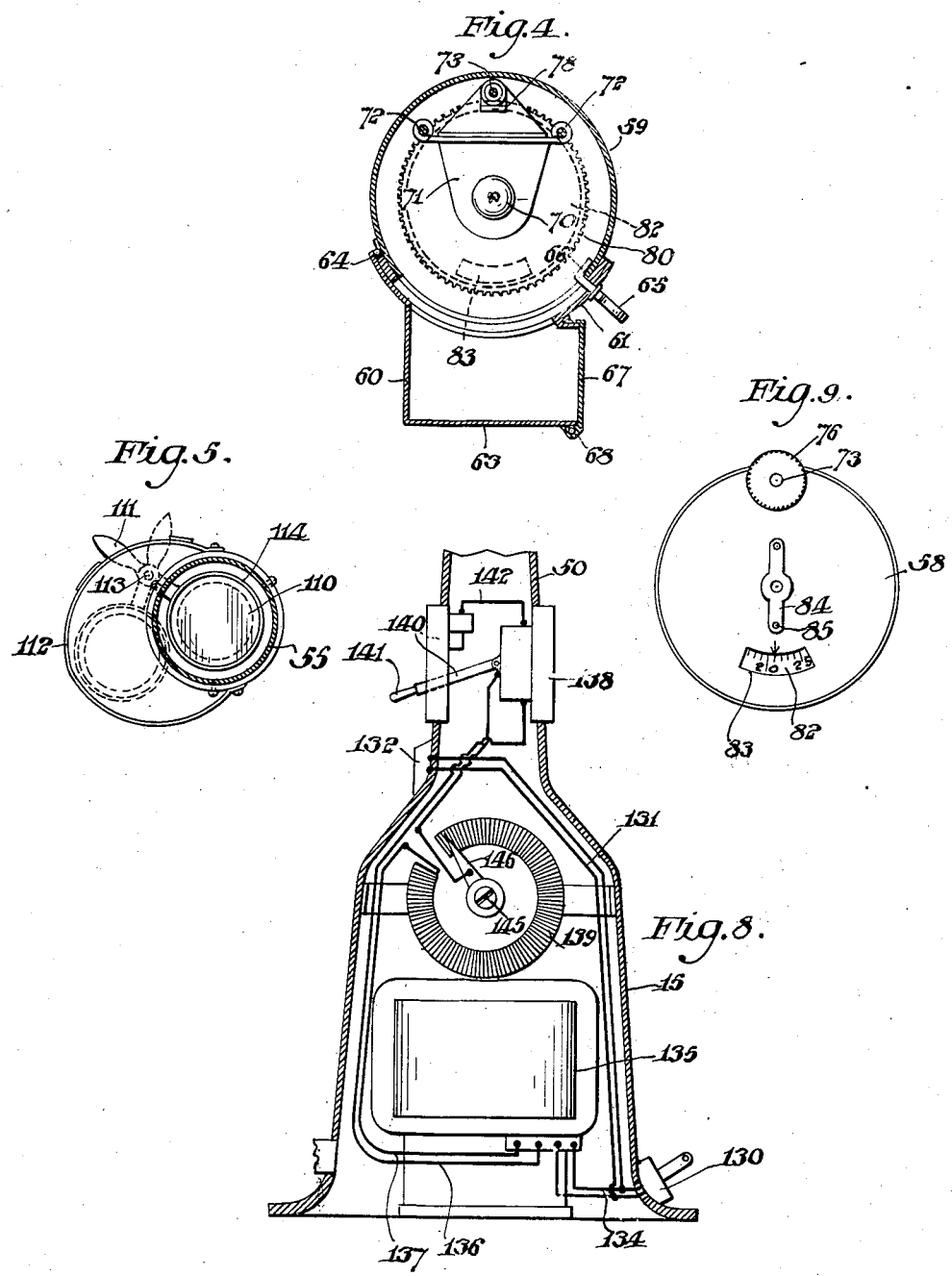

Patented Apr. 29, 1941

2,240,156

UNITED STATES PATENT OFFICE 2,240,156

APPARATUS FOR DETERMINING THE MINIMUM LIGHT VISIBLE

Jacob B. Feldman, Philadelphia, Pa.

Application July 17, 1937, Serial No. 154,176

6 Claims. (Cl. 88—20)

This invention relates to apparatus for determining the minimum light visible and for ascertaining the presence or absence of the normal minimum light threshold and also for ascertaining and determining the light intensity visible to a person over a selected time interval.

The invention relates more particularly to an instrument of this character which will be reliable in operation and will provide an adequate quantitative determination.

In efforts which have heretofore been made to study dark adaptation as evidence of the sensitivity of various retinal elements of the eye, and to determine thereby the existence of pathological conditions requiring treatment the instruments proposed for that purpose were generally relatively complex, have not generally proven reliable in practice, did not permit of an objective approach with respect to the person being tested, were not free from possibilities of error on the part of the patient or person being tested, or did not within themselves prevent the occurrence of error on the part of or deception by the person being tested.

Dark adaptation is the progressively increasing sensitivity of the eye to light in a totally dark room. The smallest amount of light that is visible to the dark adapted eye is called the light minimum, the minimum light visible or the light threshold, and for a normal person takes a known and predetermined course when considered in terms of light intensity and time. In order to determine the dark adaptation it is essential that the eye be conditioned by exposure to a light source of sufficient intensity for a period of time which permits of the eye becoming light adapted. After this light adaptation has been effected, the source of light is removed, the person being tested is maintained in absolute darkness for a predetermined interval and thereafter by a related series of tests it is ascertained whether or not the person being tested is normal or has a pathological condition, and at the same time the character and extent of departure from normal may be ascertained. A light source of predetermined character with the intensity small, measured and variable is used for this series of tests.

If the person under test is unable to observe any light from this small source within a predetermined time interval, or if the quantity observed does not, when suitably plotted against elapsed time, approach a norm, or if the readings obtained indicate an irregular light-time sensitivity during the test, the person under test cannot be considered as normal and may be studied further for the purpose of treatment.

It is an object of the present invention to provide a suitable instrument for quantitatively determining dark adaptation.

It is a further object of the present invention to provide an instrument for ascertaining and determining the course of dark adaptation.

It is a further object of the present invention to provide an instrument for ascertaining and determining the course of dark adaptation which instrument will have a high order of accuracy and will permit of repetition of the test while maintaining the same test conditions in the instrument.

It is a further object of the present invention to provide an instrument for effecting light adaptation and determining the course of dark adaptation.

It is a further object of the invention to provide an instrument for determining the course of dark adaptation which will be inherently free from error or deceptive attempts on the part of the person being tested, and which may be easily controlled and operated by the person making the test.

It is a further object of the invention to provide an instrument for determining the course of dark adaptation with which the determinations can be quickly and easily obtained and which can be manipulated in absolute darkness.

It is a further object of the invention to provide an instrument for measuring the threshold for light of different predetermined colors or wave lengths.

Other objects of the invention will appear from the annexed specification and claims.

The nature and characteristic features of the invention will be more readily understood from the following description, taken in connection with the accompanying drawings forming part hereof, in which:

Fig. 2 is a plan view of the apparatus shown in Fig. 1;

Fig. 3 is a fragmentary vertical central sectional view of a portion of the apparatus shown in Fig. 1, illustrating the optical system and the control of the character and quantity of light made available to the person being tested;

Fig. 4 is a vertical sectional view of the apparatus taken approximately on the line 4—4 of Fig. 1;

Fig. 5 is a vertical sectional view of the apparatus taken approximately on the line 5—5 of Fig. 1;

Fig. 6 is a fragmentary view showing certain details of the iris mechanism and the control structure therefor;

Fig. 7 is a view in perspective of one form of cap which is employed for the purpose of controlling and varying the shape and extent of the visual field;

Fig. 8 is a fragmentary perspective view of the casing or body portion of the instrument illustrating certain controls provided in the instrument;

Fig. 9 is a rear view of the tubular casing portion of the instrument;

Fig. 10 is a front elevational view of another form of cap which is employed for the purpose of providing visual field portions of different colors or wave lengths of light;

Fig. 11 is a sectional view taken on the line 11—11 of Fig. 10; and

Fig. 12 is a sectional view taken on the line 12—12 of Fig. 10.

Figure 1:
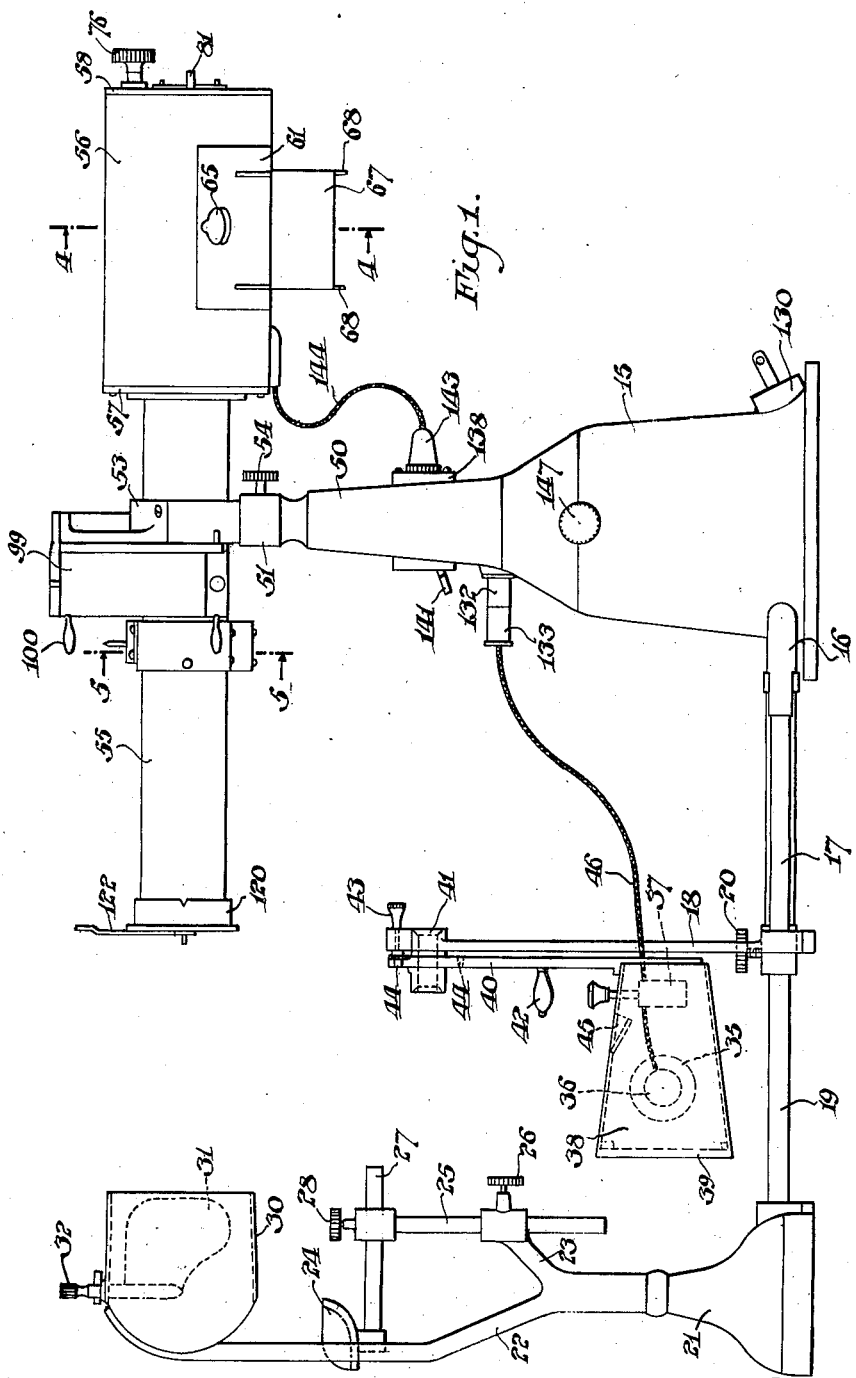
Figure 1 is a side elevational view of a preferred embodiment of the apparatus of the present invention.

It will, of course, be understood that the description and drawings herein contained are illustrative merely, and that various modifications and changes may be made in the structure disclosed without departing from the spirit of the invention.

Referring more particularly to the drawings in which a preferred embodiment of the invention is illustrated, it will be seen that there is provided a hollow casing portion 15. The casing portion 15 has secured thereto a plurality of tubular guides 16 within which telescoping tubes 17 are provided with an upright 18 secured to the forward ends thereof. The central tube of the telescoping tubes 17 is adapted to receive and have telescoped therein a tubular portion 19, an adjusting screw 20 being provided for holding the tubular portion 19 in either the extended position or in the contracted position. At the forward end of the tubular portion 19 another base portion 21 is provided which has suitable upright portions 22 and 23.

Provision is made for determining and fixing the person to be tested with respect to the other portions of the instrument and preferably includes a chin rest 24 supported by a rod 25, vertical adjustment of the rod 25 being provided by the thumbscrew 26. The chin rest 24 is mounted on a horizontally disposed rod 27 carried at the upper end of the rod 25, the rod 27 being adjustable horizontally and held in adjusted position by the thumbscrew 28.

The upright portion 22 has a hood 30 secured at the upper end thereof, and a vane 31 mounted therein for swinging movement by means of a handle 32 is provided to shield either the left or right eye as desired, or may be swung to a position so that both eyes are unshielded.

A field for obtaining light adaptation of the person to be tested is provided and preferably includes a suitable source of light of sufficient strength and intensity to provide for complete light adaptation within a period of from two to five minutes as may be found desirable under usual conditions. A 100-watt incandescent lamp as at 35 has been found suitable for this purpose where the time period stated is used. The lamp 35 is mounted in a socket 36 which is connected to a push pull switch 37 and the lamp 35 is preferably mounted within a lamp casing 38. The casing 38 is preferably provided at the forward end thereof with a field 39 which may be frosted or flashed glass for diffusing the light from the lamp 35. The lamp casing 38 is preferably mounted upon an arm 40 which is pivotally supported as at 41 on the upright portion 18 secured to the ends of the outer pair of telescoping tubes 17. A handle 42 may be provided on the arm 40 for facilitating the movement thereof.

The lamp casing 38 is adapted to be swung from the position shown in Fig. 1 to a position for light adaptation in alinement with the hood 30 and a spring pressed pin 43 is adapted to engage suitable apertures 44 for holding the lamp casing 38 in either of the positions referred to. The lamp casing 38 is preferably ventilated and for this purpose suitable apertures 45 may be provided therein. Electrical conductors 46 are connected to the switch 37 as hereinafter more fully referred to.

The casing portion 15 has an upwardly extending portion 50 with a collar 51 at the top for receiving a downwardly extending pin 52. The pin 52 is secured to a supporting ring 53 and a thumbscrew 54 is provided in the collar 51 so that the ring 53 and the structure carried thereby may be removed if desired. The ring 53 carries a horizontally disposed tube 55 which may have the interior thereof lined with dull black paper or may be painted a dull black.

The rear end of the tube 55 has secured thereto a tubular casing 56, comprising end portions 57 and 58 and a side wall portion 59. The interior of the tubular casing 56 may be lined with dull black paper or may be painted a dull black.

The lower side of the wall portion 59 is preferably provided with a compartment having a rear wall 60, a front wall 61, side walls 62 and a bottom wall 63, the rear wall 60 being secured to the wall portion 59 by a hinge connection 64. A rotatable lock member is provided on the front wall 61 and has a portion 65 for engagement by the fingers of the operator and a portion 66 for engagement with the inner face of the wall 59, for permitting access to the interior of the tubular casing member 56 upon swinging of the compartment downwardly from the hinge 64. A door 67 is mounted at the front edge of the bottom wall 63 by suitable hinges 68, the space within the compartment being sufficient for the insertion of a photometer (not shown) for measuring the intensity of the light source hereinafter referred to.

A second light source in addition to that for obtaining light adaptation is also provided and this second light source, with an associated optical system, is used for measuring the light threshold and determining the course of dark adaptation of the person to be tested.

The system for ascertaining the course of dark adaptation or minimum light visible which forms part of the instrument, must have the characteristic of reliability, relative freedom from fluctuation due to changes of the voltage of the circuit to which the instrument is connected, freedom from changes in intensity due to other causes, freedom from the possibility of error, the characteristic of reproducibility, and adequate means of control and recording.

The system for ascertaining the course of the minimum light visible preferably includes a small incandescent lamp 70 of low voltage and preferably operating at about 6.3 volts and 0.3 ampere. The lamp 70 is preferably selected for its reliability, matured in order to maintain a substantially constant output of light during its useful life, must provide a light output of predetermined or determinable quantity and must at all times be available for determination and checking of the light output.

This lamp 70 is preferably mounted in a suitable socket secured to a lamp carriage 71. Guide rods 72 extending between the end walls 57 and 58 are provided for supporting the lamp carriage 71 for slidable movement therealong. A rod 73 having a thread 74 thereon is mounted at one end in a bearing 75 in the end portion 57 and extends through a bearing in the other end wall 58 and a knurled handle 76 is provided on the end thereof for turning the rod 73 as desired.

The lamp carriage 71 is provided with a nut 78 at the upper portion thereof for engagement with the thread 74 on the rod 73.

The rod 73 is provided with a pinion 79 which meshes with a gear 80 carried on a shaft 81 journaled in the end portion 58. The shaft 81 also has secured thereto, for movement with the gear 80, a disc 82 having suitable indicia thereon for indicating the location of the lamp 70 with reference to other structure hereinafter referred to. An aperture 83 is provided in the rear wall 58 for observing the indicia on the disc 82 and ascertaining the position of the lamp 70.

A ratchet 84 may be mounted on the rear wall 58 and have a pin 85 for engagement in suitable apertures in the disc 82.

An iris diaphragm and indicating and control mechanism therefor are provided in front of the ring 53 and in front of the lamp 70 for controlling the quantity of light passing along the tube 55 toward the front end thereof. The iris diaphragm, shown at 90, is mounted within the tube 55, and includes a plurality of swingable leaves 91.

The opening through the iris diaphragm 90 is adapted to be varied to control the quantity of light passing from the source as hereinafter more fully referred to and preferably has a minimum opening of one millimeter diameter and a maximum opening of thirty-three millimeters diameter. The opening and closing of the iris diaphragm 90 is controlled by a lug 92 secured to a ring (not shown) for swinging the leaves 91 in the well known manner. The lug 92 is in engagement in a slot in a ring 93 movable on a sleeve 94, the sleeve 94 being fixed with respect to the ring 53 and the tube 55.

The ring 93 has secured thereto a curved segmental member 95. The segmental member 95 is provided at the ends thereof with clamping plates 96, screws 97 and nuts 98 for removably mounting a chart or record slip 99 on the outer face of the curved segmental member 95. A handle 100 is provided for swinging the curved segmental member 95 and the lug 92 which controls the opening of the iris diaphragm to any desired position from the minimum opening to the maximum opening of the iris diaphragm 90.

An abutment 101, supported from the ring 53, is provided and has an edge portion 102 along which a pencil may be moved for marking on the chart 99 to indicate the quantity and extent of diaphragm opening. The abutment 101 has a dividing portion 103 so that indications for the left eye or for the right eye may be made on the chart 99 by the person carrying out the test without being handicapped by the darkness which is essential to the test.

The edge of the curved segmental member 95 may be provided with suitable graduations corresponding to openings of the diaphragm of the iris in terms of millimeters.

A diffusing plate 105 which may take the form of ground, frosted or flashed glass is provided within the tube 55 and preferably to the rear of the iris diaphragm 90 and a daylight filter 106 is also provided preferably adjacent the diffusing plate 105. The daylight filter 106 rectifies the light transmitted from the lamp 70 so as to provide a true white light which is comparable to the average north sky.

A neutral filter 110 is provided within the tube 55 and in front of the diaphragm 90, and as shown in Fig. 5 may be swung by means of a handle 111 from a position in alinement with the axis of the tube 55 or may be swung to a position within a projecting extension 112 of the tube 55, as shown in dotted lines in Fig. 5, out of alinement with the tube 55. A bearing pin 113 is provided for swingably supporting the filter carrier 114. The neutral filter 110 preferably has a transmission factor of approximately 1% so as to reduce the quantity of light from the source 70 which will be visible under conditions hereinafter more fully referred to.

The front end of the tube 55 preferably has a carrier 115 threaded therein, the carrier 115 being provided with a diffusing plate 116 of flashed or frosted glass to provide a visual field. The field may be located at any desired distance from the iris diaphragm 90 although in the instrument shown the distance is of the order of 19 centimeters. A cap 120 shown in detail in Fig. 7 is mounted on the end of the tube 55. The cap 120 is provided with an aperture 121 to limit the field observable on the plate 116 and an opaque screen 122 is pivotally mounted on the outer face of the cap 120 by means of a screw 123. The screen 122 may be turned from the position shown in Fig. 7 to the right where it will abut against a pin 124 and screen half of the aperture 121 or may be movable to the left where it will abut against a pin 125 and screen the other half of the aperture 121, or, if desired, may be placed in the position as shown in Fig. 7.

A spring arm 126 is mounted on the face of the screen 122 and has a pin portion at the end thereof for engagement in suitable apertures (not shown) on the face of the cap 120 for holding the screen 122 in the selected position. The cap 120 is in loose frictional engagement with the end of the tube 55 and may be turned by means of the projecting lugs 127 to any desired angular position selected by the operator. The position of the lugs 127 indicates to the operator the angular disposition of the aperture 121.

The effective brightness of the stimulus may be varied by variation of the position of the lamp 70 with respect to the iris diaphragm 90, a variable spacing of from 11 to 24 centimeters preferably being provided. This variable spacing, the variation of the opening of the iris diaphragm 90, and the use of the neutral filter 110 provide for a variation of light at field 116 from a minimum of .00000045 millilambert to a maximum of .120020 millilambert.

The electrical system preferably employed will now be referred to.

A plug 130 is preferably provided in the casing portion 15 for attachment to a conventional 110-115 volt alternating current source (not shown). A pair of conductors 131 lead from the plug 130 to a socket 132 also provided on the casing portion 15 and a plug 133 is provided to which the conductors 46 are connected for supplying electrical energy to the lamp 35 for illuminating the field 39. The switch 37 provides for control of the illumination of the lamp 35.

Conductors 134 are also provided from the plug 130 to the primary winding of a transformer 135 which is mounted within the interior of the casing portion 15. The use of a low voltage lamp at 70, and a step-down transformer 135 reduces the effect of line voltage fluctuation and assists in maintaining a constant output of light from the lamp 70.

Conductors 136 and 137 are connected to the secondary winding of the transformer 135. One of the conductors, as at 136, leads to a socket 138 and the other conductor, as at 137, is connected to one terminal of a rheostat 139 which is also mounted within the casing portion 15. The other terminal of the rheostat 139 is connected to one terminal of a knife switch 140 which has an operating handle 141 projecting beyond the casing 15. The other terminal of the knife switch 140 is connected to the socket 138 by means of a conductor 142, and a plug 143 is provided for engagement in the socket 138, conductors 144 being provided between the plug 143 and the lamp socket in the lamp carriage 71.

It is desirable that a switch be employed in the circuit which includes the lamp 70 which is substantially noiseless in operation in order that the person being tested will not be apprised of the lighting of the lamp 70 and a knife switch 140 has been found suitable for this purpose.

The provision of the rheostat 139 permits of variation of the output of the lamp 70, although it is desirable in order to deter unnecessary adjustment to enclose the rheostat 139 within the casing portion 15 and provide a slot 145 for engagement by a screw driver for changing the position of the arm 146 of the rheostat 139. A small plug 147 is provided in the casing 15 for closing the aperture through which access is obtained to the slot 145 when the proper adjustment has been made.

An alternative form of cap is illustrated in Figs. 10, 11 and 12 and includes a tubular portion 150 for engagement with the front end of the tube 55. The tubular portion 150 is provided with guides 151 at the sides thereof and a stop 152 at the bottom thereof, for slidably receiving a plate 153. The plate 153 is provided with a portion 154 for facilitating the removal of the plate from the guides 151 and 152, and a spring clip 155 in engagement with an aperture 156 insures the setting of the plate 153 in the proper location.

The plate 153 is preferably provided with a bearing sleeve 159, having a central aperture 157, and a shield 158 is swingably mounted on the bearing sleeve 159 for shielding the central aperture 157 as desired. A plurality of apertures 156 are provided in the plate 153.

A circular disc 160 is provided on the bearing sleeve 159 and has a plurality of apertures 161 for alinement as desired with the apertures 156. The disc 160 is also provided, preferably between the apertures 161, with colored filters for alinement with the apertures 156 which may be of any desired color or may transmit light of any preferred wave length. It is desirable that true spectral colors be employed. In the cap shown in Fig. 10, one of the filters, as at 162, may be red, of a wave length of approximately 687 Angstrom units; one may be green, as at 163, with a wave length of approximately 527 Angstrom units; one may be yellow, as at 164, with a wave length of approximately 590 Angstrom units and one may be blue, as at 165, with a wave length of approximately 486 Angstrom units. Suitable pins 166 may be provided on the disc 160 for effecting rotation thereof so that the colored filters are in alinement, and in any desired location with respect to the apertures 156, or so that the apertures 161 may be placed in alinement with the apertures 156.

A ratchet 167 is preferably provided for engagement with suitable slots in the rear face of the disc 160 for holding the disc and the filters or apertures thereof in any desired position with respect to the apertures 156.

The method of using the instrument in ascertaining the course of dark adaptation and the minimum light visible as characteristics of the eyes of the person to be tested will now be pointed out.

Before proceeding with the test with the instrument it is desirable to prepare the pupils of the eyes, and for this purpose a suitable myotic may be employed which will have the purpose of contracting the pupil and maintaining the pupil in a constant contracted state during the test.

The person to be tested is preferably seated with the temporal portion of the face at the hood 30 and the chin rest 24 is adjusted by means of the thumbscrews 26 and 28 to a position to support the face and eyes at a level which corresponds to the axis of the tube 55. The lamp casing 38 is swung to its upper position and the room is darkened to a condition of absolute darkness. The lamp 35 is lighted by actuation of the switch 37 and the person being tested is directed and required to look at the field 39 which is illuminated by the lamp 35 and is required to continue looking at the field 39 for a period of approximately two to five minutes as desired, this period having been found sufficient to obtain a condition of light adaptation. The lamp 35 is then extinguished by means of the switch 37, the pin 43 is released and the lamp casing 38 is swung by means of the handle 42 to a downward position. The operator may, when he desires, and preferably before the lamp 35 is extinguished, supply electrical energy to the lamp 70 by operation of the knife switch 140. The operator may then and thereafter as frequently as desired turn the cap 120 by grasping the projecting portions 127 with the fingers so that the aperture 121 points in any preferred direction, this being done without the person being tested having any knowledge as to the angular disposition thus selected.

A very small quantity of light is supplied from the lamp 70, passes through the diffusing plate 105, the daylight filter 106, the iris diaphragm 90, the neutral filter 110 and illuminates the field 116. The quantity or intensity of the light thus supplied is measured and determined by the setting of the lamp 70, by actuation of the knob 76, at the desired position with respect to the iris diaphragm 90 and the iris diaphragm 90 is manipulated to give the size of aperture or opening therethrough as desired.

The color quality of the light is made certain by the daylight filter 106.

After the lamp 35 has been extinguished, a period of several minutes will elapse during which the person being tested may be passing from the light adapted condition to the dark adapted state, and whether normal or not, this period will pass before the person being tested will be able to see any light passing through the aperture 121 in the cap 120.

Upon manipulation of the iris diaphragm 90 until the light is observed by the person being tested, a check being provided by requiring that person to indicate the approximate direction or inclination of the aperture 121, a pencil mark and record may be made upon the chart 99 by drawing the point along the abutment 102 in accordance with the particular eye being tested, and a notation made of the elapsed time.

This operation of varying the quantity of light either by means of the iris diaphragm alone or by means of the iris diaphragm and the location of the lamp 70 with respect to the iris diaphragm 90 is repeated at fixed intervals of time, preferably of the order of two or three minutes and extending over a period which may range from twelve minutes to thirty minutes or more, although if the period is extended beyond the thirty minute period, five minute readings are sufficient for most purposes.

It has been found in most cases that if normal dark adaptation is present in the person being tested during the first twelve to fifteen minute period there is a very rapidly increasing sensitivity to light and in the remaining fifteen minutes, if a half hour period of test is provided, the ultimate threshold will have been reached and definitely indicated.

Upon the completion of the readings the size of the pupil may be measured in any suitable manner and, if necessary or desirable, the intraocular tension and the perimetric reading taken.

If it is desired to study the threshold for different colors in place of the threshold for white light heretofore referred to the cap shown in Figs. 10, 11 and 12 may be substituted for the cap 120 shown in Fig. 7. The patient is then required to indicate the visibility of one or more of the colored filters 162, 163, 164 or 165, either in the relationship to the other colored filters, or in the relationship to the aperture 157 with the shield 158 in the position to uncover this aperture. At any time if desired a shift from the colored fields to the white field may be effected by turning the disc 160 to place the apertures 161 in alinement with the apertures 156. As heretofore pointed out, the quantity of light available at the field 116 may be varied by movement of the lamp 70 and by the control of the iris diaphragm 90 and suitable indications of readings for the color or colors observed may be entered on the chart 99 in the manner heretofore pointed out.

I claim:

1. Apparatus for determining dark adaptation of human eyes including the combination of a base having an optical tube to be supported within the direct field of vision of the eyes and a housing pivoted thereto for movement into and out of said field of vision, said housing having a source of relatively high intensity illumination therein adapted to be viewed by said eyes for a period determined by said intensity sufficient to produce light adaptation, said optical tube having a screen adjacent the end thereof towards the eyes, a source of illumination of predetermined small intensity adjustably supported therein for movement toward and away from the screen, means operatively connected with said source of predetermined small intensity for indicating the position of movement of said source, an iris diaphragm between said screen and said source of predetermined small intensity and means for varying and indicating the size of the opening of said iris diaphragm, said screen illuminated by said source of illumination of predetermined small intensity being adapted to be viewed after the first source of illumination has been viewed and moved out of the direct field of vision and being varied in its intensity of illumination by the adjustment of said source of predetermined small intensity and being determined as to its visible intensity of illumination as varied by the size of the opening in the iris diaphragm and the means for indicating the position of movement of said source of predetermined small intensity when at the threshold of vision of the said eyes for ascertaining the dark adaptation of said eyes when recovering from said light adaptation.

2. Apparatus for determining dark adaptation of human eyes including the combination of a support having a first source of relatively high intensity illumination and a viewing screen therefor both movably carried by said support with said screen having such characteristics that it may be illuminated by said first source to substantially uniform intensity throughout its area and may be brought into the normal line of vision through said apparatus into an operative position so as to expose the eyes under test to said first illumination for a period, determined by the said intensity of said first source, sufficient to produce light adaptation, and thereafter be removed from said line of vision into an operative position so as to terminate said exposure, a second source of illumination of a predetermined small intensity and a viewing screen therefor also carried by said support with said second screen lying substantially in the same normal line of vision as said first screen in its operative position and adapted to be viewed by said eyes after the said exposure of said first source has been terminated and as the eyes recover from said high intensity light adaptation, adjustable means associated with said second light source for varying the visible illumination intensity of said second screen as perceived by said eyes along said line of vision, a rotatable cap member mounted on the support between said screen and the said eyes under test having an elongated opening therein adapted to be moved to different meridianal directions and means correlated with said adjustable means for indicating the visible intensity of said second screen when at the threshold of vision of said eyes for ascertaining the dark adaptation of said eyes.

3. Apparatus for determining dark adaptation of human eyes including the combination of a base having an optical tube supported thereon within the normal field of vision of the eyes in said apparatus and a housing pivotally connected to the base for movement into and out of said field of vision, said housing having a first source of relatively high intensity illumination and a viewing screen therein having such characteristics that it may be illuminated by said first sources to substantially uniform intensity throughout its area and which, when in said field of vision, is adapted to be viewed by said eyes for a period, determined by said intensity, sufficient to produce light adaptation, said optical tube having a viewing screen supported adjacent the end thereof toward the eyes and having a source of illumination of predetermined small intensity adjustably supported therein for movement toward and away from said tube screen and for increasing and decreasing the illumination intensity on said tube screen, means for varying the visible area of said tube screen, said tube screen lying within the same field of vision as the said housing screen and being adapted to be viewed after the first source of illumination has been viewed and moved out of the direct field of vision and means correlated with and movable by the adjustment of said source of predetermined small intensity and the said area varying means for determining the visible intensity of illumination of said screen and the extent of the visible area respectively when at the threshold of vision of said eyes when recovering from said light adaptation for ascertaining the dark adaptation of said eyes.

4. Apparatus for determining dark adaptation of human eyes including the combination of a support, a first source of relatively high intensity illumination and a viewing screen therefor with said screen having such characteristics that it may be illuminated by said first source to substantially uniform intensity throughout its area, means on the support for movably carrying said source and screen, the source and screen being movable into an operative position in the normal line of vision of said apparatus so as to expose the eyes under test to said first illumination for a period, determined by the said intensity of said first source, sufficient to produce light adaptation, the source and screen being also movable away from said line of vision into an inoperative position so as to terminate said exposure, a second source of illumination of a predetermined small intensity and a viewing screen therefor also carried by said support with said second screen lying substantially in the same normal line of vision as said first screen in its operative position and so positioned as to be viewed by said eyes after the said exposure of said first screen has been terminated and after said first screen has been removed from said line of vision, without necessitating movement of said eyes from their first exposure position, and as the eyes recover from said high intensity light adaptation, adjustable visibility varying means associated with said second light source for varying the visibility of said second screen as perceived by said eyes along said line of vision, and value indicating means correlated with said adjustable means for indicating the degree of visibility of said second screen when at the threshold of vision of said eyes for ascertaining the dark adaptation of said eyes.

5. Apparatus for determining dark adaptation of human eyes including the combination of a support, a first source of relatively high intensity illumination and a viewing screen therefor with said screen having characteristics such that it may be illuminated by said first source to substantially uniform intensity throughout its area, means on said support for movably carrying said source and screen, the source and screen being movable into an operative position in the normal line of vision of said apparatus so as to expose the eyes under test to said first illumination for a period, determined by the said intensity of said first source, sufficient to produce light adaptation, the source and screen being also movable away from said line of vision into an inoperative position so as to terminate said exposure, a second source of illumination of a predetermined small intensity and a viewing screen therefor also carried by said support with said second screen lying substantially in the same normal line of vision as said first screen in its operative position and so positioned as to be viewed by said eyes after the said exposure of said first screen has been terminated and after said first screen has been removed from said line of vision, without necessitating movement of said eyes from their first exposure position, and as the eyes recover from said high intensity light adaptation, adjustable illumination intensity varying means associated with said second light source for varying the visible illumination intensity of said second screen as perceived by said eyes along said line of vision, quality controlling means associated with said second screen for controlling the quality of the illumination of said second screen as perceived by the eyes under test and value indicating means correlated with said adjustable means for indicating the visible intensity of said second screen when at the threshold of vision of said eyes for ascertaining the dark adaptation of said eyes.

6. Apparatus for determining dark adaptation of human eyes including the combination of a support, a first source of relatively high intensity illumination and a viewing screen therefor with said screen having characteristics such that it may be illuminated by said first source to substantially uniform intensity throughout its area, means on the support for movably carrying said source and screen, the source and screen being movable into an operative position in the normal line of vision of said apparatus so as to expose the eyes under test to said first illumination for a period, determined by the said intensity of said first source, sufficient to produce light adaptation, the source and screen being also movable away from said line of vision into an inoperative position so as to terminate said exposure, a second source of illumination of a predetermined small intensity and a viewing screen therefor also carried by said support with said second screen lying substantially in the same normal line of vision as said first screen in its operative position and so positioned as to be viewed by said eyes after the said exposure of said first screen has been terminated and said first screen has been removed from said line of vision, without necessitating movement of said eyes from their first exposure position and as the eyes recover from said high intensity light adaptation, adjustable area and illumination intensity varying means carried by said support in association with said second light source for separately varying the visible area and the illumination intensity of said second screen respectively as perceived by said eyes along said line of vision and value indicating means correlated with said adjustable means for separately indicating the visible area and the intensity of said second screen respectively when at the threshold of vision of said eyes for determining the dark adaptation of said eyes.

JACOB B. FELDMAN.